June 5, 1962  B. J. HARMON  3,037,613
HANGER FOR CONVEYOR SCREW
Filed May 20, 1959

INVENTOR
Billy J. Harmon

BY

ATTORNEY

3,037,613
HANGER FOR CONVEYOR SCREW
Billy J. Harmon, Fort Worth, Tex., assignor to Industrial Machinery Company, Inc., Fort Worth, Tex.
Filed May 20, 1959, Ser. No. 814,567
1 Claim. (Cl. 198—213)

This invention relates to shaft hangers, and it has particular reference to hanger supports for shafts of considerable length, especially as used in flight or screw conveyors which are suspended in troughs, and a prime object of the invention is that of providing a hanger which is adapted to be supported along the sides of a conveyor trough in such manner as to maintain the shaft in proper alignment therewith.

An object of the invention resides in the provision of a shaft hanger having a bearing support detachably connected thereto and capable of vertical and angular adjustment to permit limited disalignment of the shaft without impairing its proper function.

Another object of the invention is that of providing a shaft hanger having a bearing retainer thereon capable of removably receiving different types of friction or non-friction bearings, and having means for lubricating the same.

Broadly, the invention contemplates the provision of a bearing hanger especially adapted for flight or screw type conveyor shafts wherein the bearing can be removed for repair or replacement without dismantling the shaft and providing suitable adjustments therefor as required.

Figure 1:
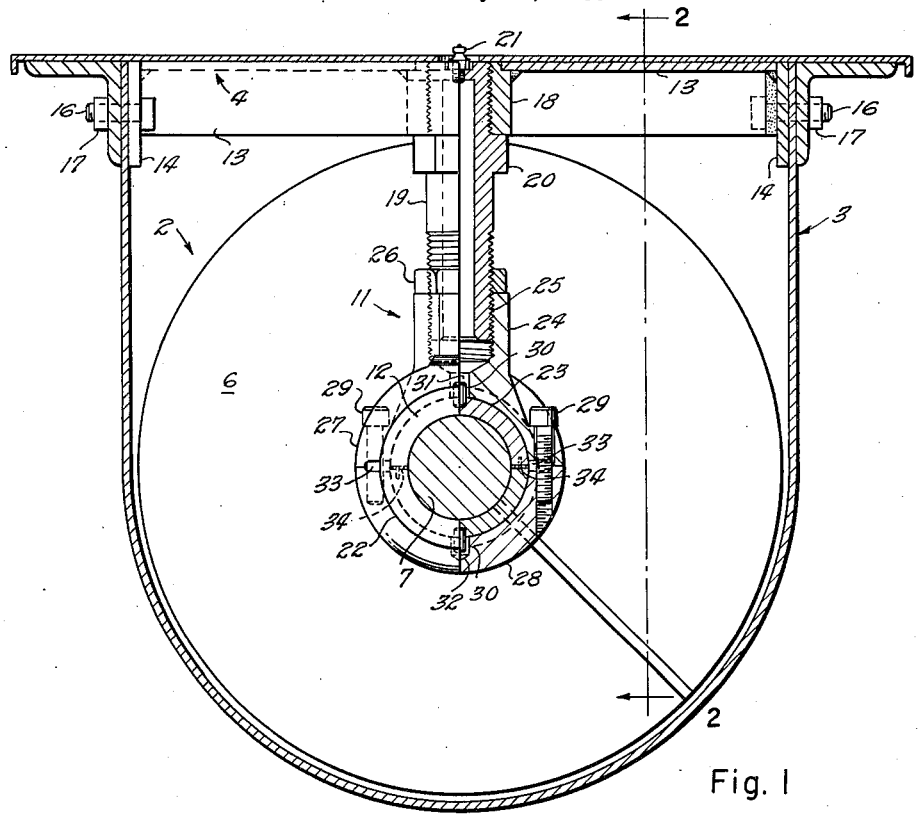
Figure 2:
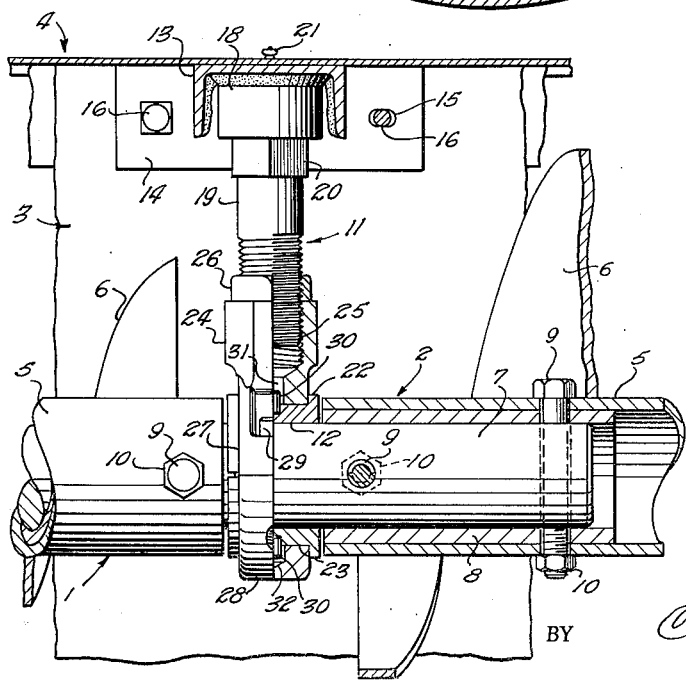

The invention will be readily understood by referring to the following description and the accompanying drawing, in which:

FIGURE 1 is a transverse sectional elevational view, partly broken away to show details of construction, showing a hanger for a conveyor screw embodying the invention in its operative position relative to a screw conveyor having a screw and a trough therefor; and FIGURE 2 is a fragmentary longitudinal elevational view, partly in section taken on the line 2—2 of FIGURE 1.

Referring to the drawing, the numerals 1 and 2 designate generally adjoining sections of a conveyor screw which is operatively positioned in a trough therefor, indicated generally by the numeral 3. The trough 3 has a removable cover, indicated generally by the numeral 4.

The sections 1 and 2 of the conveyor screw each consist of a central pipe 5 having a helical, ribbon-like vane or flight 6 formed thereon and extending spirally from one of its ends to the other. The adjoining ends of the sections 1 and 2 are connected in spaced apart relation to each other by a coupling shaft 7.

A pair of bushings 8 are received in adjoining ends of the central pipes 5, and have the adjacent ends of the coupling shaft 7 secured therein. Two pairs of bolts 9 extend transversely through aligned openings therefor in the pipes 5, the coupling shaft 7, and the bushings 8, and have nuts 10 applied thereto.

The numeral 11 designates generally the hanger of this invention, which is positioned between the adjoining sections 1 and 2 of the conveyor screw and provides a support therefor whereby the screw is adapted to be suspended from the sides of the trough 3. The hanger 11 includes a bearing 12, as hereinafter described, in which the coupling shaft 7 is journaled.

The hanger 11 also includes a supporting frame consisting of a channel shaped member 13 having depending side flanges which is arranged transversely of the trough 3, and a pair of end plates 14 which extend beyond the side flanges and are arranged parallel to the sides of the trough 3, in juxtaposed relation thereto.

A pair of horizontally extending slots 15 are formed in opposite ends of the end plates 14. A pair of bolts 16 extend through the slots 15, and through corresponding openings therefor in the sides of the trough 3, and have nuts 17 applied thereto, whereby the hanger 11 is adjustably connected to the trough 3.

The hanger 11 is capable of a limited longitudinal adjustment relative to the sides of the trough 3, whereby the bearing 12 may be aligned lognitudinally with the portion of the coupling shaft 7 which extends between the adjacent ends of the pipes 5.

An internally threaded collar 18 is connected to the channel shaped member 13, centrally thereof, between its side flanges, and depends therefrom. The upper end of the collar 18 extends through an opening therefor in the channel shaped member 13, and is positioned immediately below the cover 4.

A tubular member 19, which is externally threaded at its ends, has one of its ends received in the collar 18, and depends therefrom. The tubular member 19 has a polygonal enlargement 20 intermediate its ends for engagement by a wrench.

A lubricating fitting 21 is received in a restricted orifice therefor in the upper end of the tubular member 19, and extends upwardly through an opening in the cover 4.

The bearing 12 may be either babbitted or bronze, for example, and consists of two complementary semi-circular sections which together embrace the coupling shaft 7. The bearing 12 has a pair of peripheral flanges 22 adjacent its ends which define between them a peripheral groove 23.

A fitting 24 has a socket 25 therein which is threaded on the lower end of the tubular member 19, and depends therefrom. A lock nut 26, which is threaded on the tubular member 19 above the fitting 24, secures the fitting 24 against displacement from the tubular member 19.

The fitting 24 has a bifurcated, semi-circular lower end 27 which coacts with a semi-circular fitting 28 to embrace the bearing 12, and to provide a support therefor. The fittings 24 and 28 are connected by a pair of screws 29, which are inserted in aligned openings therefor on opposite sides of the respective fittings.

The semi-circular lower end 27 of the fitting 24 and the semi-circular fitting 28 each correspond to one of the semi-circular sections of the bearing 12, and are received in the corresponding portions of the peripheral groove 23.

Each of the semi-circular sections of the bearing 12 has a pin 30 which is positioned intermediate its ends, centrally of the corresponding portion of the peripheral groove 23, and extends radially outwardly therefrom.

The fitting 24 has a central bore 31 which extends upwardly from the inner periphery of its semi-circular lower end 27 and communicates at its upper end with the lower end of the socket 25. The semi-circular fitting 28 has a central bore 32 which extends downwardly from its inner periphery, diametrically opposite the bore 31 of the fitting 24.

The bores 31 and 32 loosely surround the pins 30, whereby the bearing 12 is capable of a limited adjustment relative to the hanger 11, sufficient to permit the bearing 12 to be aligned axially with the coupling shaft 7.

Lubricant introduced into the interior of the tubular member 19, through the lubricating fitting 21, is communicated to the peripheral groove 23 of the bearing 12 through the bore 31 of the fitting 24. The opposed surfaces of the fittings 24 and 28 have recesses 33 therein communicating with the peripheral groove 23 at the juncture of the semi-circular sections of the bearing 12, which have spacer elements 34 between them whereby fluid communication is established between the recesses 33 and the opposed surfaces of the bearing 12 and the coupling shaft 7.

The invention may be modified in various ways without departing from the spirit and scope thereof.

What is claimed is:

In a screw conveyor having a screw operatively positioned in a trough therefor, a hanger for the screw providing a support therefor whereby the screw is adapted to be suspended from the sides of the trough, the hanger being positioned between adjoining sections of the screw and having a supporting frame extending transversely of the trough and having side plates arranged parallel to the sides of the trough, in juxtaposed relation thereto, a bearing in which a coupling shaft connecting the adjoining sections is journaled, the bearing consisting of two complementary semi-circular sections which together embrace the coupling shaft and having a pair of peripheral flanges adjacent its ends which define between them a peripheral groove, and means for suspending the bearing from the supporting frame including a collar rigidly connected to the supporting frame and depending therefrom, a tubular member having one of its ends connected by threads to the collar and depending therefrom, the tubular member having a polygonal intermediate portion for engagement by a wrench, a first fitting having a socket portion connected by threads to the lower end of the tubular member and depending therefrom, and having a bifurcated, semi-circular lower end portion, and a semi-circular second fitting coacting with the first fitting to embrace the bearing and to provide a support therefor, the first and second fittings being connected by screws inserted in aligned openings therefor on opposite sides of the respective fittings, the semi-circular lower end of the first fitting and the semi-circular second fitting each corresponding to one of the semi-circular sections of the bearing and being received in the corresponding portions of the peripheral groove, each of the semi-circular sections of the bearing having a pin positioned intermediate its ends, centrally of the corresponding portion of the peripheral groove, and extending radially outwardly therefrom, the first fitting having a central bore extending upwardly from the inner periphery of its semi-circular lower end and communicating at its upper end with the interior of the tubular member, the semi-circular second fitting having a central bore extending downwardly from its inner periphery, diametrically opposite the bore of the first fitting, the bores loosely surrounding the respective pins whereby the bearing is capable of a limited adjustment relative to the first and second fittings, sufficient to permit the bearing to be aligned axially with the coupling shaft, the tubular member having a lubricating fitting in its upper end extending above the trough and the arrangement being such that lubricant introduced into the interior of the tubular member, through the lubricating fitting, is communicated to the peripheral groove of the bearing through the bore of the first fitting, the opposed surfaces of the first and second fittings having recesses therein communicating with the peripheral groove at the juncture of the semi-circular sections of the bearing, and the bearing sections having spacer elements between them whereby fluid communication is established between the recesses and the opposed surfaces of the bearing and the coupling shaft.

References Cited in the file of this patent

UNITED STATES PATENTS

| 701,636 | Smith et al. | June 3, 1902 |
| 2,279,201 | Kozak et al. | Apr. 7, 1942 |

FOREIGN PATENTS

| 194,931 | Germany | Feb. 1, 1908 |
| 576,391 | Great Britain | Apr. 2, 1946 |